Jan. 25, 1949.                M. O. PETROFF ET AL                2,460,190
                              WIRE RECORDER INDICATOR
Filed March 21, 1946                                        2 Sheets-Sheet 1
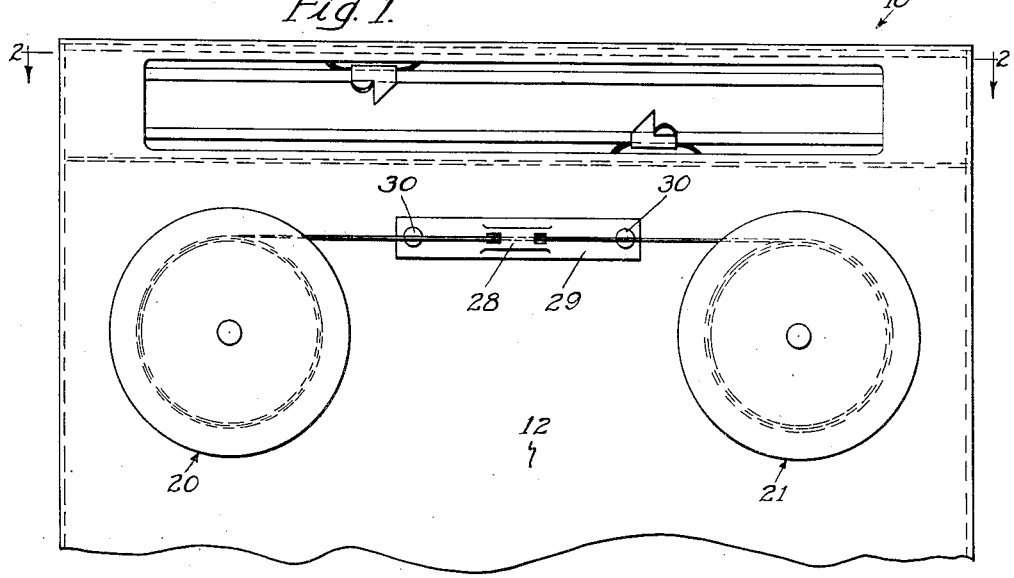
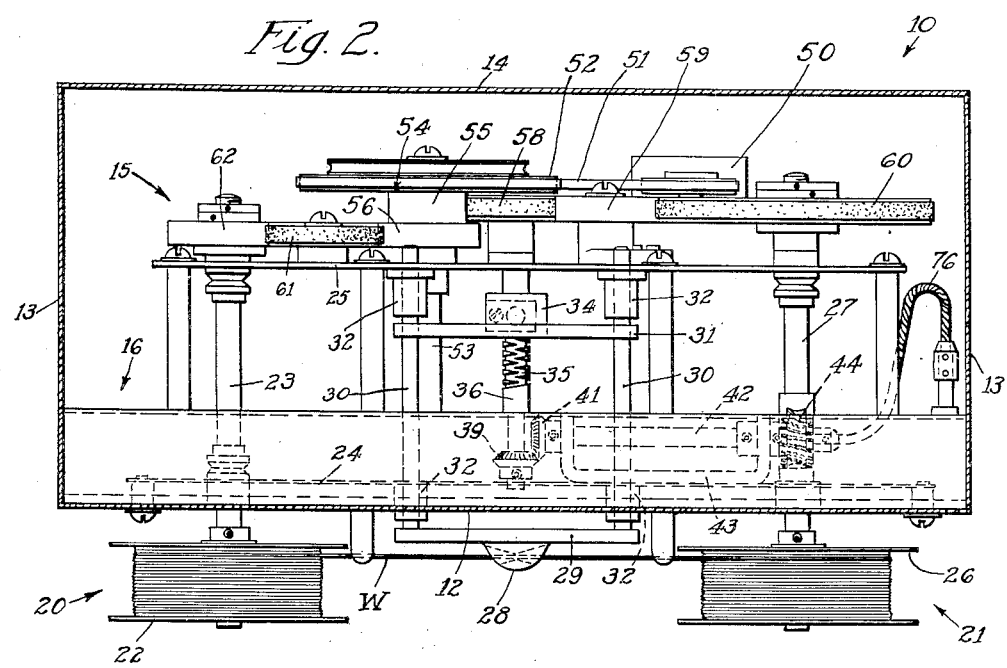
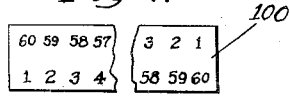
Inventors:
Merlin O. Petroff,
William F. Straub.

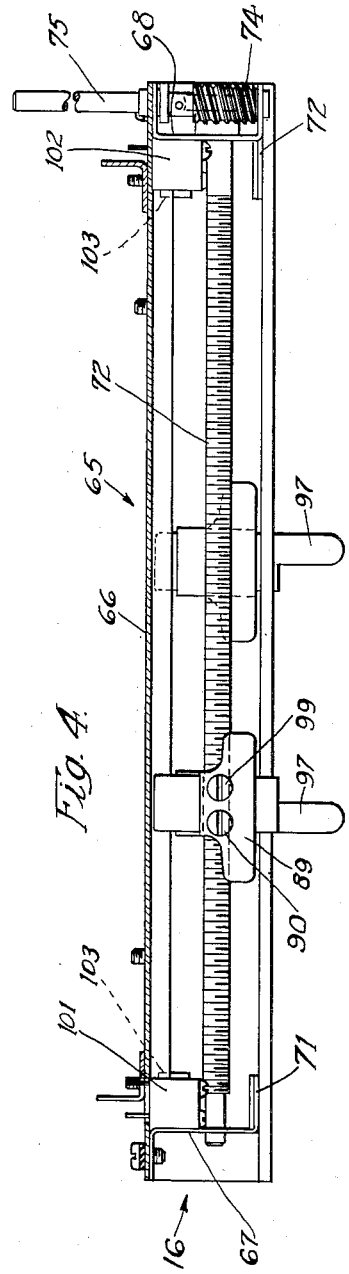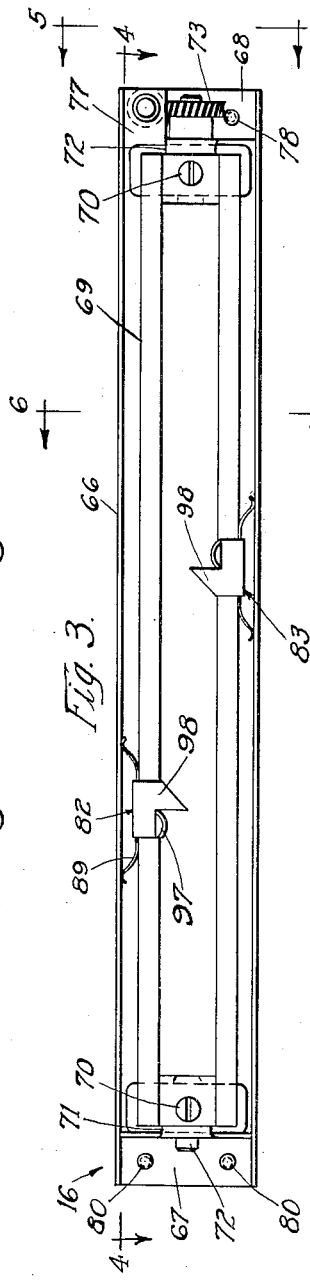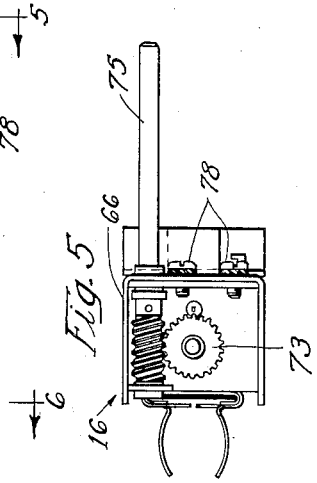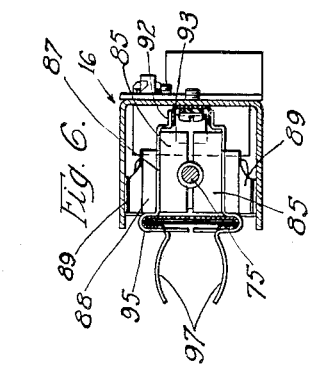

Patented Jan. 25, 1949

2,460,190

UNITED STATES PATENT OFFICE 2,460,190

WIRE RECORDER INDICATOR

Merlin O. Petroff, Lake Bluff, and William F. Straub, Chicago, Ill., assignors to Charles P. Peirce, Evanston, Ill.

Application March 21, 1946, Serial No. 656,141

6 Claims. (Cl. 33—127)

Our present invention relates to an improvement in a wire recorder indicator, and more particularly to a device for indicating the amount of wire on the supply and take-up spools of a wire recorder, and for effecting stopping of the wire recorder drive mechanism when the wire has been substantially withdrawn from one spool and wound upon the other spool, or when wire of a predetermined amount has passed from one spool to the other spool.

In the use of wire recorders it is desirable to provide an indicating device which, for example, during the travel of wire from the supply spool to the take-up spool affords a visual indication of the amount of wire on each of the spools so that at all times the operator will know how much wire remains on the supply spool when making a recording. Further it is desirable in a wire recorder to provide means for setting the machine, for example, to record a predetermined amount of wire. Also, such a device preferably should provide for the automatic stopping of the driving mechanism of the recorder when the wire is substantially completely wound upon either of the spools, or as in the instance previously noted, when a predetermined amount of wire has passed from one spool to the other spool to effect stopping of the driving means to discontinue movement of the wire from the one spool to the other spool.

It is an object of my invention to provide an indicating device of the character above referred to which is of simple and sturdy construction.

A further object is to provide an indicating device having indicating means for indicating the relative amount of wire on each of the supply and take-up spools of a wire recorder.

A further object is to provide an indicating device of the character noted comprising a first indicating means for indicating the relative amount of wire on each of the supply and take-up spools, and operative to effect stopping of the driving mechanism of the recorder when the wire is substantially wound completely on either the supply or take-up spools.

A further object is to provide an indicating device of the character noted comprising a second indicating means manually positionable for effecting travel of a predetermined amount of wire from one spool to the other spool of a wire recorder, and operable upon travel of said predetermined amount of wire to effect stopping of the driving mechanism of the recorder.

A further object is to provide an indicating device comprising a first indicating means for indicating the relative amount of wire on each of the supply and take-up spools, and operative to effect stopping of the driving mechanism of the recorder when the wire is substantially wound completely on either the supply or take-up spools, and a second indicating means manually positionable for effecting travel of the predetermined amount of wire from one spool to the other spool of the recorder, and operable upon travel of such predetermined amount of wire from the supply spool to the take-up spool to effect stopping of the driving mechanism of the recorder.

In the preferred embodiment of our invention herein disclosed we propose to provide a device of the above character comprising an elongated casing positionable conveniently at the front of the recorder and which embodies a feed screw mounted for rotation within the casing and adapted to be rotated by the driving means of the recorder.

A preferred feature of construction of our invention resides in the provision of a pair of indicating means each of which comprises a half-nut member normally held in threaded engagement with the feed screw by spring means forming a part of each of the indicating means. The feed screw is adapted to be rotated by the driving mechanism of the recorder and the rotation thereof bears a direct relationship to the revolutions of the supply and take-up spools of the wire recorder. The arrangement of the half-nut members of each of the pairs of indicating means is such so that they are adapted to pass each other on the feed screw. The indicating means by virtue of the half-nut members are adapted to be moved lengthwise relative of the casing and by their relative position with respect to the casing indicating either (1) the relative amount of wire on each of the take-up and supply spools or (2) the amount of recording time remaining of a predetermined time for which the device has been set.

A further preferred feature resides in utilizing the scale supporting member together with the spring means for each of the indicating means for normally maintaining the half-nut members of the latter in threading engagement with the feed screw to effect travel of the indicating means along the feed screw and relative lengthwise of the casing, and in which the indicating means are movable manually to effect the disengagement of the half-nut members against the force of the spring means to adjust the positions thereof along the feed screw.

A still further preferred feature resides in the provision of switch means adjacent each end of the feed screw which are adapted to be actuated by the indicating means when disposed at the ends of the feed screw.

The above and other objects and features of our invention will appear from the detail description.

Now, in order to acquaint those skilled in the art with the manner of constructing and utilizing indicating devices in accordance with our invention, we shall describe in connection with the accompanying drawings a preferred embodiment of our invention.

In the drawings:

Figure 1 is a front elevational view of the upper portion of a wire recorder in which the indicating mechanism of our invention has been embodied;

Figure 2 is a horizontal view taken substantially on the line 2—2 of Figure 1 looking in the direction indicated by the arrows, and illustrating in plan a driving mechanism of a wire recorder and the connection thereof with the indicating mechanism of our invention;

Figure 3 is a front view of the indicating mechanism of our invention;

Figure 4 is a view taken substantially on the line 4—4 of Figure 3 looking in the direction indicated by the arrows, and showing in plan the indicating device of our invention with the vertical rear wall of the elongated housing for the mechanism being shown in section;

Figure 5 is an end view of the right hand end of the device of Figure 3, taken substantially on the line 5—5 of the latter figure looking in the direction indicated by the arrows;

Figure 6 is a detail vertical sectional view taken substantially on the line 6—6 of Figure 3 looking in the direction indicated by the arrows; and Figure 7 is a view of a slide-rule type of dial or scale member calibrated in terms of wire length adapted to be supported in the scale supporting member of the indicating mechanism of our invention, and providing for a visual indication of the relative positions of a pair of indicating means forming part of the device of our invention.

Referring now to Figures 1 and 2, I have shown a known form of wire recorder 10 comprising a vertically extending front panel or wall 12, a pair of end walls 13—13 and a rear wall 14 with these several walls forming a casing which encloses the driving mechanism 15 for the recorder and the indicating device 16 of our invention.

The driving mechanism 15 of the wire recorder and the assembly thereof in the housing for the apparatus forms no part of our present invention and may vary widely in form. The wire recorder 10 chosen for the purposes of describing one embodiment of our present invention comprises a supply reel means 20 and a take-up reel means 21. The supply reel means 20 comprises a supply spool 22 adapted to be removably associated with and fixed for rotation on a shaft 23 mounted in the pair of spaced vertical panels 24 and 25 for rotation about a fixed horizontal axis. The take-up reel means 21 also comprises a take-up spool 26 which is adapted to be removably mounted upon and rotatable with a shaft 27, which shaft 27 is also suitably supported for rotation about a fixed horizontal axis in the panel members 24 and 25. A magnetic recording head 28 of known construction is carried by a plate or panel 29 the opposite side edges of which have one end of each of a pair of guide rods 30—30 suitably secured thereto with the guide rods adjacent their opposite ends being secured to a reciprocating plate member 31.

Suitable guide bearing sleeve members 32—32 are carried by each of the panels 24 and 25, with each pair of guide sleeves 32 for each of the guide rods 30 providing for guiding the horizontal movement of the latter. The reciprocating plate member 31 carries a nut 34 substantially centrally thereof which is adapted to have threading engagement with the double screw thread 35 formed in a shaft 36 the opposite ends of which are suitably journaled in panels 24 and 25 so that upon rotation of the shaft 36 the reciprocating mechanism comprising the reciprocating plate 31, the pair of guide shafts 30—30, and the panel 29 effect reciprocation of the magnetic head 28 axially of the spools 23 and 26 to guide the wire W from the supply spool 22 to the take-up spool 21 or vice versa. The shaft 36 adjacent its forward end has a bevel gear 39 suitably secured thereto which has meshing engagement with a bevel gear 41 fixed to a shaft 42 and which shaft 42 adjacent its opposite end is supported in a substantially U-shaped bracket 43 suitably fixed upon the rear surface of the wall or panel member 24. The shaft 42 at its other end has a worm gear 44 secured thereto which is adapted to have meshing engagement with a worm member fixed to the shaft 27 of the take-up reel means 23. Thus upon rotation of the take-up reel means 21 the worm gear 44 is caused to be rotated effecting rotation of shaft 42 and the bevel gear 41 thereof, which by its meshing engagement with the bevel gear 39 effects rotation of the shaft 36 for moving the magnetic head 28 and guide the wire W in its travel from the supply reel to the take-up reel or vice versa.

The drive means 15 is of a character for effecting the selective rotation of either the supply reel means 20 or the take-up reel means 21 and comprises an electric motor 50, the armature shaft of which carries a pulley about which and a pulley 52 a drive belt 51 is trained. The pulley 52 is fixed to a jack shaft 53 having its opposite ends suitably journaled for rotation in the panel members 24 and 25.

The jack shaft 53 has a drive wheel 54 secured thereto comprising a pair of cylindrical friction drive surfaces 55 and 56 of different diameters with the surface 55 being adapted to have driving engagement with a friction wheel 58 which in turn is adapted to have driving engagement with a fixed driven wheel 59, and which in turn has driving engagement with a friction wheel 60 fixed to the rearward end of the shaft 27. The cylindrical friction drive surface 56 of the wheel 54 is adapted to have driving engagement with a friction driven wheel 61 which in turn has friction driving engagement with a wheel 62 fixed to the rearward end of the shaft 23. The driven wheels 58 and 61 are movably mounted and are adapted to have selective driving engagement with the cylindrical drive surfaces 55 and 56, respectively of the drive wheel means 54. When the driven wheel 58 is positioned to engage the cylindrical drive surface 55 of the drive wheel 54 and the driven wheel 59, the driven wheel 61 is adapted to be positioned out of engagement with the cylindrical surface 56 of the drive wheel 54 so that when the wheels are engaged as last described the shaft 27 of the take-up wheel means 21 is adapted to be rotated effecting travel of the wire W from the supply spool 22 to the take-up spool 21. This drive through the worm wheel 44 meshing with the worm fixed on shaft 27 effects the reciprocation of the recording head 28 as previously described.

When the driven wheel 61 is caused to be engaged with the cylindrical drive surface 56 of the drive wheel 54, and the wheel 62 fixed to shaft 23, the supply wheel means 20 is adapted to be rotated to effect travel of the wire W from the take-up spool back to the supply spool with the take-up wheel means 21 being caused to be rotated through the wire W and thereby effect actuation of the reciprocating mechanism for guiding the wire from the take-up spool to the supply spool.

The above form of drive mechanism is disclosed in greater detail in the copending application of William G. Knapp, Serial No. 631,392, filed November 28, 1945, to which reference may be had for a more detail description of such drive mechanism, but which of itself forms no part of our present invention. It will be understood that the above drive mechanism is only of one form with which our present invention may be used; and that many forms of drive mechanisms for selectively imparting drive either to a take-up reel means or a supply reel means are known and with which our present invention may be readily embodied.

Referring now more particularly to Figures 3 through 6, it will be seen that the indicating mechanism of our invention comprises an elongated casing 65 formed by a channel shaped frame member 66 in the opposite ends of which a pair of brackets 67 and 68 are suitably secured with a scale supporting frame member 69 extending lengthwise of the open face of the channel shaped member 66 and secured by a pair of screws 70 to the integral tongue or ear members 71 and 72 of the brackets 67 and 68 respectively. A feed screw 75 extends lengthwise within the casing, and is mounted for rotation substantially centrally thereof by the mounting of its ends in the bracket members 67 and 68. A worm wheel 73 is suitably connected to one end of the feed screw 72 with the worm wheel having meshing engagement with a worm 74 fixed to the end of a shaft 75 which has connection through a flexible cable 76, as shown in Figure 2, with the outer end of the shaft 42 and which is adapted to be rotated in opposite directions upon rotation of either of the take-up or supply reel means. The shaft 75 is adapted to be mounted for rotation at one end in the ear or flange 77 formed integrally of the bracket 68 and which bracket is suitably secured to the rear wall of the channel member 66 by screws 78—78. The bracket 67 is similarly connected by a pair of screws 80—80 to the back wall of the channel member 66. A pair of indicating means 82 and 83 each comprising a half nut member 85 adapted to have threading engagement with the feed screw 75 with the half nut members 85—85 of the indicating means 82 and 83 being disposed respectively above and below the horizontal longitudinal plane in which the axis of the feed screw 75 lies.

The half nut members 85 each have secured thereto an indicator member 87 by means of block members 88 and between which block members of each of the indicating means 82 and 83, leaf springs 89 are arranged between the upper and lower walls of the channel shaped frame member 66 respectively. The indicating means 82 and 83 each comprising an indicator member 87 together with a block member 88, a spring 89, and a half nut element 85 are secured together as integral units by a pair of screws 90—90 having threaded engagement in the half nut members 85. It will be observed that the indicator members 87 each comprise an inwardly disposed guide flange portion 92 adapted to have sliding engagement with a channel shaped guide member 93 secured to the rear wall of the channel shaped frame member 66 to extend lengthwise of the casing. The scale supporting member 69, as shown, has its upper and lower edges rounded and extended toward each other and the indicator members 87 are each provided with a rounded portion 95 fitting over the rounded edges of the scale supporting member. The indicator members 87 each have a handle lug 97 projecting forwardly of the scale supporting member 69, and an integral pointer portion or element 98 providing visual indication of the positions of the indicating means 82 and 83 with respect to a slide-rule type of dial or scale 100 calibrated in terms of wire length, shown in detail in Figure 7, which is adapted to be supported within the scale supporting member 69 between the rounded lengthwise upper and lower edges thereof. A pair of switches 101 and 102 are suitably supported adjacent the opposite ends of the feed screw 72 and rearwardly in the casing. The switches are each provided with an operating button 103 adapted to be engaged by either of the indicating means 82 or 83 when disposed in a position on the feed screw at the ends thereof for actuating the switches 101 or 102.

The spring means 89 of each of the indicating means 82 and 83 provide for biasing of the half nut members 85 into engagement with the feed screw 72, with the indicator members 87 in engagement with the rounded upper and lower edges of the scale supporting member 69 to effect a driving engagement between each of the indicating means and the feed screw 72. Upon grasping of the handle portions 97 of either of the indicating means 82 and 83, it will be observed that the springs 89 may be flattened against the normal biasing force thereof, and the half nut members 85 raised to a position clearing the threads of the feed screw 72 so that the indicating members 82 and 83 may be moved or shifted lengthwise of the casing for effecting positioning of the same in any desired relation with respect to the feed screw 72.

Assume now that the supply spool 22 has substantially all the wire wound thereon and it is mounted on the shaft 23 and lead wire is threaded through the magnetic head 22 and connected to the take-up spool 26. With this condition the indicating means 83 is positioned to the left hand end of the casing as viewed in the several figures so that upon engagement of the friction wheel 58 with the cylindrical drive portion 55 of the drive wheel 54 to rotate the shaft 27 the travel of the pointer element 98 of the indicating means 83 will indicate to the operator of the recording device the amount of wire on the supply and take-up spools. As previously noted rotation of the take-up reel means 21 will through the flexible cable 76 and its connection with the shaft 75 effect rotation of the feed screw 72 to effect movement of the indicating means 83 to the right as viewed in the drawings. The scale 100 is suitably calibrated in any desired manner for indicating the number of feet of wire or the like remaining on the supply spool. When the indicating means 83 reaches its right hand position it engages the actuating button 103 of the switch 102 actuating this switch to its open position and opening the circuit of the electric motor 50 to effect stopping of the driving mechanism 15. This actuation of the switch 103 by indicating means 83 is preferably calculated so that the interruption of the driving mechanism of the recorder is effected when the wire W has been substantially completely wound upon the take-up spool 26.

Assuming again that the driving mechanism 15 has been actuated to drive the take-up reel means 21, it will be observed that the indicating means 82 may be positioned manually to provide for the recording of a predetermined amount of wire after which the indicating means 82 will engage the button 103 of the switch 102 to deenergize the electric motor 50 to stop the driving mechanism 15. When the driving mechanism 15 is actuated to drive the take-up reel 26, the indicating means 82 is caused to be moved to the right by the feed screw as viewed in the several figures so that by adjusting the pointer element 98 of the indicating means 92 with respect to the scale 100 supported by the scale supporting member a recording period based on a predetermined length of wire may be provided for and with the driving mechanism being stopped upon expiration of such time.

Upon actuation of the driving mechanism 15 as by engaging the driven wheel 61 with the drive surface 56 of the drive wheel 54 to rotate the supply spool 22 to draw the wire W to the left as viewed in Figure 2 from the take-up reel to the supply reel, the indicating means 83 is caused to be moved to the left by the feed screw 72, and when it reaches its left hand position it engages the button 103 of the switch 101 to interrupt the circuit for the electric motor, and stop the drive mechanism and in which position substantially all of the wire will be wound upon the supply reel 22.

It will thus be observed that in the indicating mechanism of our invention the indicating means 83 provides for the visual determination of the amount of wire on either of the supply and take-up reels, and provides for the stopping of the drive mechanism when the wire is substantially completely wound upon either of the spools. Further that the indicating means 82 enables setting of the machine to provide a recording of a predetermined amount of wire with this latter means being resettable manually in order to vary the amount of recording wire desired.

As shown in Figure 1 the indicating means of our invention is mounted rearwardly and at the upper end of the front wall of the wire recorder, with this wall being provided with a lengthwise extending slot through which the handle elements 97 project and through which the slide rule dial or scale 100 is readily visible. This is a convenient position for the indicating means but it will be understood that it may be associated with the wire recorder in other manner and arrangements as desired.

While we have shown what we consider to be the preferred embodiment of our invention it will be understood that various modifications and rearrangements may be made therein without departing from the spirit and scope of our invention.

We claim:

1. In an indicating device for a wire recorder or the like having driving means for causing wire to travel from a supply spool to a take-up spool the combination of casing means comprising a substantially channel shaped member having end wall elements, and a scale supporting member extending lengthwise of said channel member across the open face thereof, a feed screw adapted to be rotated by said driving means extending lengthwise within said casing and mounted for rotation in said end wall elements, and a pair of indication means each comprising an indicator element adjacent the outer face of said scale supporting member, and a half nut member having threaded engagement with said feed screw, said half nut members of said indicating means being disposed on opposite sides of the axis of said feed screw, said indicator means being adapted to be moved along said feed screw by rotation of the latter to move the indicator elements thereof lengthwise relative to said scale supporting member.

2. In an indicating device for a wire recorder or the like the combination of casing means including a scale supporting member forming a front wall therefor and being adapted to support a rule type scale element calibrated in terms of wire length, feed screw means extending lengthwise of said casing and mounted for rotation therein, and a pair of indicating means each having a half-nut member disposed on either side of a horizontal longitudinal plane passing through the axis of said feed screw means, and spring means between each of said indicating means and said casing means for maintaining said indicating means in sliding engagement with said scale supporting member and each of said half-nut members in threaded engagement with said feed screw means, whereby each of said indicating means is adapted to be moved axially of said feed screw means upon rotation of the latter and relative to said rule type scale element adapted to be supported by said scale supporting member.

3. In an indicating device for a wire recorder or the like the combination of casing means including a scale supporting member forming a front wall thereof and being adapted to support a rule type scale element calibrated in terms of wire length, feed screw means extending lengthwise of said casing and mounted for rotation therein, and a pair of indicating means each having a half-nut member disposed on either side of a horizontal longitudinal plane passing through the axis of said feed screw means, spring means between each of said indicating means and said casing means for maintaining said indicating means in sliding engagement with said scale supporting member and each of said half-nut member in threaded engagement with said feed screw means, and an indicator member for each of said pair of indicating means having a pointer element providing a visual indication of the positions of said indicating means relative to the rule type scale element adapted to be supported by said scale supporting member, each of said indicating means being adapted to be moved lengthwise relative to said scale supporting member and axially along said feed screw by rotation of the latter.

4. In an indicating device for a wire recorder or the like the combination of casing means including a scale supporting member forming a front wall therefor and being adapted to support a rule type scale element calibrated in terms of wire length, feed screw means extending lengthwise of said casing and mounted for rotation therein, and a pair of indicating means each having a half-nut member disposed on either side of a horizontal longitudinal plane passing through the axis of said feed screw means, spring means between each of said indicating means and said casing means for maintaining said indicating means in sliding engagement with said scale supporting member and each of said half-nut members in threaded engagement with said feed screw means, whereby each of said indicating means is adapted to be moved axially of said feed screw means upon rotation of the latter and relative to said rule type scale element adapted to be supported by said scale supporting member, and each of said indicator members having a handle element for disengaging the half-nut members from threading engagement with said feed screw against the force of the spring means associated therewith whereby either of said indicating means is adapted to be shifted manually lengthwise of said casing means.

5. In an indicating device for a wire recorder or the like having driving means including an electric motor for causing wire to travel from a supply spool to a take-up spool or vice versa, the combination of an elongated casing means, feed screw means extending lengthwise within said casing and adapted to be rotated by said driving means, a pair of indicating means each comprising a half-nut member having threading engagement with said feed screw means movable lengthwise of said casing and axially of said feed screw means by rotation of the latter, said half-nut members of said pair of indicating means providing for movement of the same past each other, and a pair of switch means one disposed adjacent each end of said feed screw means and adapted to be actuated to open position and thereby open a circuit for the electric motor of said driving means to stop the travel of wire from one spool to the other spool.

6. In an indicating device for a wire recorder or the like having driving means for causing wire to travel from a supply spool to a take-up spool, or vice versa, the combination of an elongated casing, a feed screw extending lengthwise within said casing and adapted to be rotated by driving means in opposite directions depending upon the direction of travel of wire from one spool to the other spool, a first indicating means and a second indicating means each including spring means for normally biasing the same into engagement with said feed screw for movement lengthwise of said casing and axially of said feed screw by rotation of the latter, said first and second indicating means being adapted to be manually disengaged from said feed screw against the force of said spring means for movement lengthwise of said casing to selectively position the same relative to and for engagement with said feed screw, a pair of normally closed switches one disposed adjacent each end of said feed screw for effecting operation of said driving means, said switch means having actuator members engageable by said indicating means when disposed at the ends of said feed screw for opening said switch means to render said driving means inoperative, whereby said first indicating means is adapted to be positioned at either end of said feed screw to actuate either of said switch means after the wire has been substantially completely withdrawn from one spool and wound upon the other, and said second indicating means is adapted to be positioned relative to said feed screw to actuate selectively said switch means adjacent the end of said feed screw toward which it is adapted to be moved in the travel of the wire from said supply spool to said take-up spool and upon the transfer of a predetermined amount of wire from said supply spool to said take-up spool.

MERLIN O. PETROFF,
WILLIAM F. STRAUB.

REFERENCES CITED

The following references are of record in the file of this patent:

UNITED STATES PATENTS

| Number | Name | Date |
| --- | --- | --- |
| 435,012 | Calkins | Aug. 26, 1890 |
| 912,176 | Ryan | Feb. 9, 1909 |
| 1,997,444 | Wilson | Apr. 9, 1935 |
| 2,038,880 | Willshaw et al. | Apr. 28, 1936 |
| 2,145,938 | Mansfield et al. | Feb. 7, 1939 |